UNITED STATES PATENT OFFICE.

LUDWIG KNORR, OF JENA, AND HERMANN WEYLAND, OF BERLIN, GERMANY, ASSIGNORS TO SYNTHETIC PATENTS CO. INC., OF NEW YORK, N. Y., A CORPORATION OF NEW YORK.

ESTERS OF SILICIC ACID.

1,178,731.   Specification of Letters Patent.   Patented Apr. 11, 1916.

No Drawing.   Application filed December 29, 1914.   Serial No. 879,528.

*To all whom it may concern:*

Be it known that we, LUDWIG KNORR, doctor of philosophy, professor of chemistry, and HERMANN WEYLAND, doctor of philosophy, citizens of the German Empire, residing, respectively, at Jena, Grand Duchy of Saxe-Weimar, and Berlin, Kingdom of Prussia, Germany, have invented new and useful Improvements in Esters of Silicic Acid, of which the following is a specification.

We have found that new esters of the orthosilicic acid can be obtained by heating the known silicic esters *e. g.* the tetraethyl silicic ester $Si(OC_2H_5)_4$ with polyvalent alcohols. According to the quantities of the polyvalent alcohols used different esters can thus be obtained. From glycol *e. g.* the two esters having most probably the following formulas can be obtained:

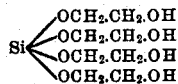   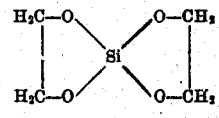

From glycerin:

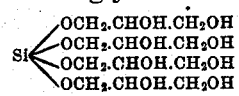

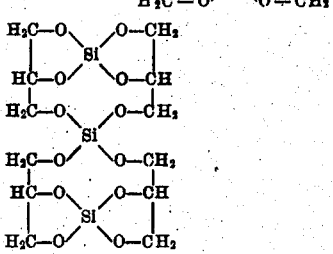

The new esters have proved to be therapeutically valuable as remedies against tuberculosis, the daily dose being from 2 to 3 grams. The esters in which all OH groups of the alcohols are linked together with the silicic acid are insoluble in water; those still containing free hydroxy groups are soluble in water.

In order to illustrate the new process more fully the following example is given:—4 molecules of glycerin (previously freed from water by heating it to 200° C.) and 1 molecule of tetraethyl silicic ester (boiling point 166° C.) are located together in an autoclave (while the mixture is being stirred) to 150° C. A limpid liquid results from which the ethylalcohol split off during the reaction is distilled over. The new silicic ester is an elastic gelatin like mass of a sweet taste having most probably the formula:

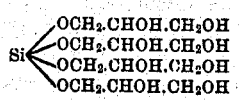

It is soluble in water, alcohol and glycerin, insoluble in ether, ligroin and chloroform. In an analogous way other of the above mentioned esters can be obtained *e. g.* the secondary glycerinorthosilicate having most probably the formula:

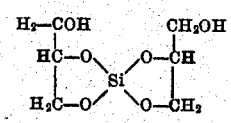

To produce this ester 2 molecules of glycerin and 1 molecule of silicic acid ethylester are heated as described above. After distilling off the alcohol a solid, brittle mass is obtained which can be easily ground into a fine powder. As far as solubility and saponification are concerned, the secondary glycerin orthosilicate resembles the primary ester.

The tertiary glycerinorthosilicate having most probably the formula:

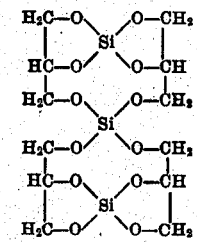

is prepared as follows:—4 molecules of glycerin and 3 molecules of silicic ester are mixed, thus forming an emulsion. If this emulsion is heated for several hours in an autoclave to 120° to 150° under stirring, a clear homogeneous liquid is obtained. From this liquid alcohol is distilled off *in vacuo* at 100°. In this manner the tertiary glycerinorthosilicate is obtained as a solid, brittle mass which can easily be ground into a fine powder. By drying the finely pulverized substance at 120° to 130° the last traces of alcohol and any excess of silicic acid ester can be removed. The tertiary ester is odorless and tasteless. In water it is insoluble. In alkali it dissolves slowly in the cold; more quickly on warming. The ester is thus saponified. On warming with mineral acid the ester is also saponified, being decomposed into glycerin and amorphous silicic acid. The primary or secondary glycolorthosilicate, the primary or secondary mannitorthosilicate, or the primary glucoseorthosilicate can be similarly prepared.

We claim:—

1. The new esters of orthosilicic acid with polyvalent alcohols, which are generally gelatin like products soluble in alcohol, and being therapeutically valuable products, substantially as described.

2. The new primary esters of orthosilicic acid with polyvalent alcohols, which are generally gelatin like products soluble in alcohol, and being therapeutically valuable products, substantially as described.

3. The new esters of orthosilicic acid with glycerin, which are generally gelatin like products soluble in alcohol, and being therapeutically valuable products, substantially as described.

4. The new primary glycerin ester of orthosilicic acid, having most probably the structure graphically represented:

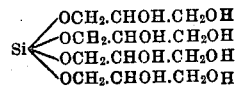

which is a gelatin like product soluble in water and alcohol, and which is a therapeutically valuable product substantially as described.

In testimony whereof we have hereunto set our hands in the presence of two subscribing witnesses.

Prof. Dr. LUDWIG KNORR.
Dr. HERMANN WEYLAND.

Witnesses as to L. K.:
  Frederick J. Schussel,
  Victor Guggenberger,
Witnesses as to Hermann Weyland:
  Henry Hasper,
  Woldemar Haupt.